United States Patent
Knight et al.

(10) Patent No.: US 9,032,258 B2
(45) Date of Patent: May 12, 2015

(54) SAFETY SYSTEM CHALLENGE-AND-RESPONSE USING MODIFIED WATCHDOG TIMER

(75) Inventors: Richard Knight, Stroud (GB); Simon Brewerton, Trowbridge (GB)

(73) Assignee: Infineon Technologies AG, Neubiberg (DE)

( * ) Notice: Subject to any disclaimer, the term of this patent is extended or adjusted under 35 U.S.C. 154(b) by 258 days.

(21) Appl. No.: 13/617,282

(22) Filed: Sep. 14, 2012

(65) Prior Publication Data

US 2014/0082434 A1     Mar. 20, 2014

(51) Int. Cl.
G05B 19/042     (2006.01)
G06F 11/07     (2006.01)

(52) U.S. Cl.
CPC .. *G05B 19/0428* (2013.01); *G05B 2219/24198* (2013.01); *G05B 2219/24125* (2013.01); *G06F 11/0739* (2013.01); *G06F 11/0757* (2013.01)

(58) Field of Classification Search
CPC ............ G06F 11/0757; G06F 11/0763; G06F 11/1402; G06F 11/1441; G06F 11/28; G06F 11/24; G06F 11/073; G06F 11/0754; G06F 11/1032; G06F 11/106; G06F 11/1064; G06F 11/1417; G06F 11/2215; G06F 11/2231; G06F 11/3419; G06F 11/362; G06F 1/14; G06F 2201/805; G06F 9/3005; G06F 9/4825; G06F 9/4881; H04L 69/28; H04L 1/1854; H04L 2012/561; H04L 2012/5619; H04L 2012/5627; H04L 2012/5649; H04L 2012/5652; H04L 29/06; H04L 67/325; H04L 67/42; H04L 69/40; G05B 19/0428; G05B 2219/23307; G05B 2219/24125; G05B 2219/24198; G05B 9/02; G05B 9/03
See application file for complete search history.

(56) References Cited

U.S. PATENT DOCUMENTS

| | | | | | |
|---|---|---|---|---|---|
| 4,674,035 | A | * | 6/1987 | Engel | 714/23 |
| 5,522,040 | A | * | 5/1996 | Hofsass et al. | 714/55 |
| 6,141,774 | A | * | 10/2000 | Mattheis | 714/27 |
| 6,665,758 | B1 | * | 12/2003 | Frazier et al. | 710/200 |
| 7,383,460 | B2 | * | 6/2008 | Sherwin et al. | 713/600 |
| 7,949,891 | B2 | * | 5/2011 | Namiki | 713/502 |
| 7,975,188 | B2 | * | 7/2011 | Saito | 714/55 |

(Continued)

OTHER PUBLICATIONS

Thomas Hafner. "Microcontrollers for Functional Safety in Automobiles." Mar. 7, 2012. 6 Pages. Retrieved from: http://www.techonlineindia.com/article/12-03-07/Microcontrollers_for_functional_safety_in_automobiles.aspx.

(Continued)

*Primary Examiner* — Marc Duncan
(74) *Attorney, Agent, or Firm* — Eschweiler & Associates, LLC

(57) ABSTRACT

Some embodiments of the present disclosure relate to a watchdog timer having an enhanced functionality that enables the watchdog timer to monitor a process flow of the microprocessor on a task-by-task basis that enables a simple output signal to be used to determine if the watchdog timer is malfunctioning. The watchdog timer has a state machine that increments a state variable from an initial value over a watchdog period. A deterministic service request, received from a microprocessor, controls operation of the watchdog timer. The deterministic service request has an indicator of a monitoring operation to be performed, a password, and an estimated state variable. A comparison element determines if the microprocessor is operating properly based upon a comparison of the received password to an expected password and the received estimated state variable to an actual state variable.

22 Claims, 8 Drawing Sheets

(56) References Cited

U.S. PATENT DOCUMENTS

| | | | |
|---|---|---|---|
| 8,019,584 B2* | 9/2011 | Jiang et al. | 703/13 |
| 8,261,134 B2* | 9/2012 | Abts et al. | 714/55 |
| 8,359,481 B2* | 1/2013 | Bancel et al. | 713/194 |
| 8,819,449 B2* | 8/2014 | Van Nieuwenhuyze | 713/190 |
| 2008/0005378 A1* | 1/2008 | Alexander et al. | 710/15 |
| 2008/0104701 A1* | 5/2008 | Peacock et al. | 726/22 |
| 2009/0006905 A1* | 1/2009 | Luick | 714/52 |
| 2009/0150696 A1* | 6/2009 | Song et al. | 713/323 |
| 2012/0281829 A1* | 11/2012 | Rudakevych et al. | 380/255 |

OTHER PUBLICATIONS

Texas Instruments "Watchdog Timer (WDT_A)" Aug. 2011. 7 Pages.

* cited by examiner

SAFETY SYSTEM CHALLENGE-AND-RESPONSE USING MODIFIED WATCHDOG TIMER

BACKGROUND

Modern vehicles include a vast array of sensors, electronic control units and actuators for systems such as air bags, power steering, braking, engine management, gearbox control, and many others. Typically, these electronic components are themselves comprised of embedded systems having a microcontroller configured to control operation of actuators by selectively processing data received from the sensors. For microcontrollers operating in safety critical and other systems, such microcontrollers must be able to handle stability issues arising from hardware and software anomalies.

Since embedded systems typically do not have users present to reset the microcontroller, watchdog timers are often used to ensure that the microcontroller is operating properly. Watchdog timers contain counters that continually increment their value. When operating correctly, the microcontroller periodically resets the counter to prevent it from reaching a value that violates a threshold value. However, when malfunctioning (e.g., in the case of a code crash) the microcontroller does not reset the counter and its value eventually reaches the threshold value. Upon reaching the threshold value, the watchdog timer will reset the microcontroller to fix the error.

DETAILED DESCRIPTION

Figure 1A:
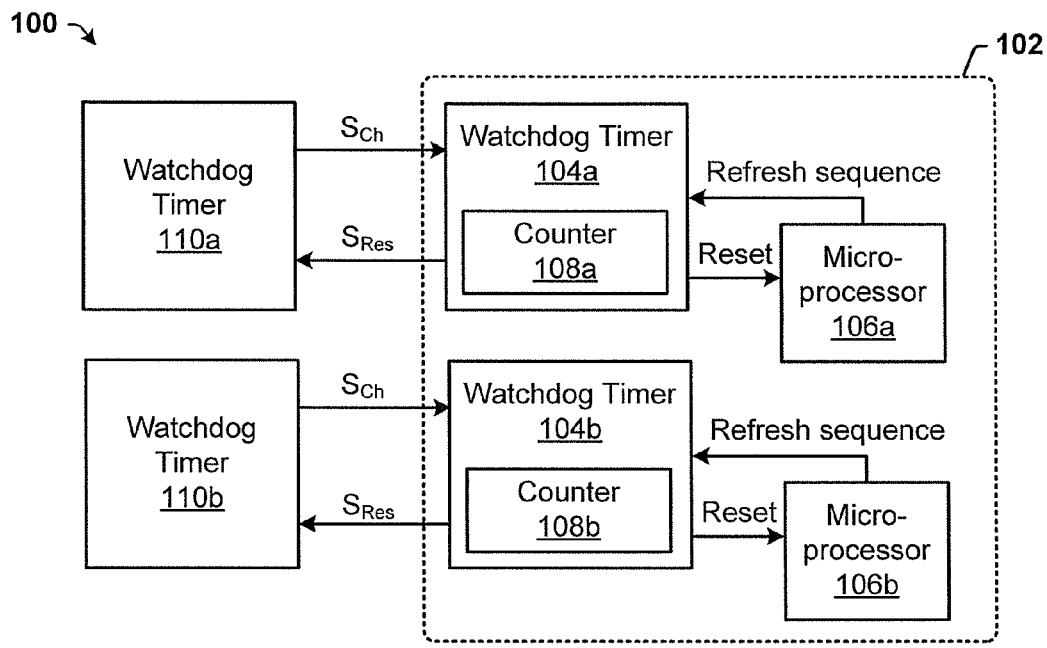
FIG. 1A is a block diagram of a conventional watchdog timer.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

FIG. 1A is a block diagram of a conventional embedded system 100. The embedded system 100 comprises a microcontroller 102 having watchdog timers, 104a and 104b, and microprocessors, 106a and 106b. Each watchdog timer 104 is configured to monitor the operation of a corresponding microprocessor 106 to ensure that the microprocessor 106 is operating correctly.

Figure 1B:
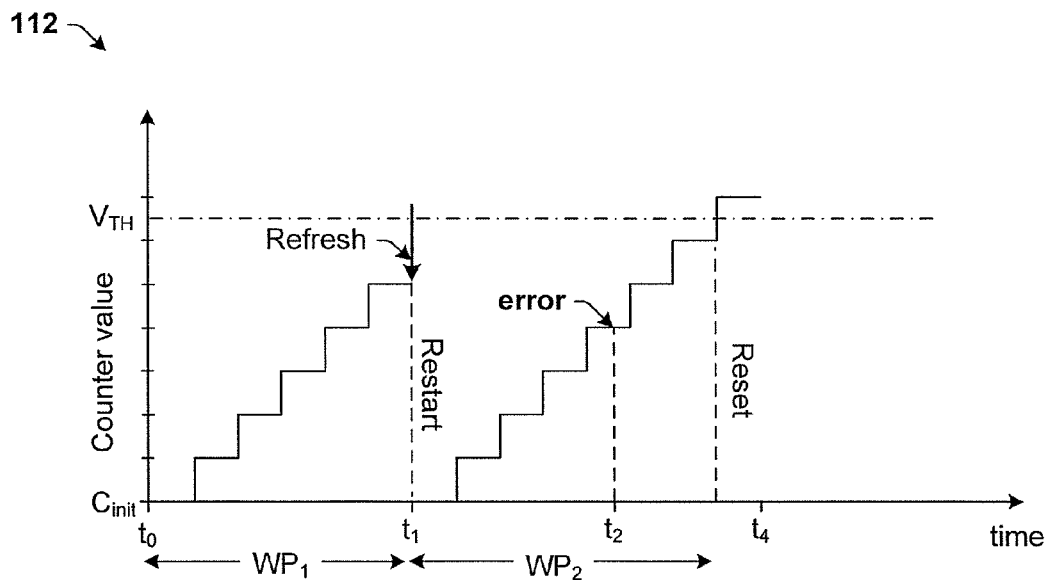
FIG. 1B is a timing diagram illustrating operation of the conventional watchdog timer.

FIG. 1B illustrates a timing diagram 112 illustrating operation of a watchdog timer 104 to reset a microprocessor 106 when it reaches a threshold value $V_{TH}$. It will be appreciated that although timing diagram 112 illustrates the watchdog timer 104 as incrementing its value, that the watchdog timer may alternatively decrement its value to force a reset at a threshold value $V_{TH}$ of zero.

During a first watchdog period $WP_1$, a counter 108 within the watchdog timer 104 begins to increment its value from an initial value $C_{init}$ at time $t_0$. The counter 108 continues to increment its value until serviced with a refresh sequence from the microprocessor 106 at time $t_1$. Upon being serviced with a refresh sequence from the microprocessor 106, the counter 108 is restarted from the initial value $C_{init}$ to avoid resetting the microprocessor 106.

As long as the watchdog timer 104 is serviced periodically, it continually increments its value. However, if the microprocessor 106 encounters a problem (e.g., a code crash) it will not be able to service the watchdog timer 104, and the watchdog timer 104 will reset the microprocessor 106 when it reaches a threshold value $V_{TH}$. For example, during a second watchdog period $WP_2$, the counter 108 begins to increment its value from the initial value $C_{init}$ at time $t_1$. At a time $t_2$, an error occurs in the microprocessor 106 that prevents it from refreshing the watchdog timer 104. Since the microprocessor 106 cannot refresh the watchdog timer 104, the counter 108 continues to increment its value unit it violates the threshold value $V_{TH}$. Upon violating the threshold value $V_{TH}$ the watchdog timer 104 sends a reset signal to the microprocessor 106, which resets the microprocessor 106.

Since the watchdog timer 104 and the microprocessor 106 are comprised within microcontroller 102, the watchdog timer 104 is unable to detect a common cause of failure that affects the components within the microcontroller 102. Therefore, the embedded system 100 further comprises an external watchdog timer 110 located outside of the microcontroller 102. The external watchdog timer 110 operates a challenge and response functionality, in which it ensures that the watchdog timer 104 is operating properly when it receives an appropriate response to a challenge it has issued to the watchdog timer 104.

For microcontroller systems having a single microprocessor, an external watchdog timer is able to properly monitor the microcontroller 102. However, many modern computer systems utilize multi-core architectures having multiple microprocessors (i.e., CPU cores). Computer systems having multiple microprocessors use multiple watchdog timers to properly monitor the system. Such systems are costly and can use a significant amount of silicon area and development cost.

Accordingly, the present disclosure relates to a watchdog timer having an enhanced functionality that enables the watchdog timer to monitor operation of one or more microprocessors on a task-by-task basis. In some embodiments, the watchdog timer comprises a state machine configured to deterministically modify a state variable from an initial value over a watchdog period. A deterministic service request, received from a microprocessor, controls operation of the watchdog timer. The deterministic service request comprises an indicator of a monitoring operation to be performed, a password, and an estimate of the state variable. A comparison element configured to compare the received password to an expected password and the received estimated state variable to an actual state variable. By including an estimated state variable in the deterministic service request of the time checks, the watchdog timer can monitor a process flow of the microprocessor on a task-by-task basis that enables a simple output signal to be used to determine if the watchdog timer is malfunctioning.

Figure 2A:
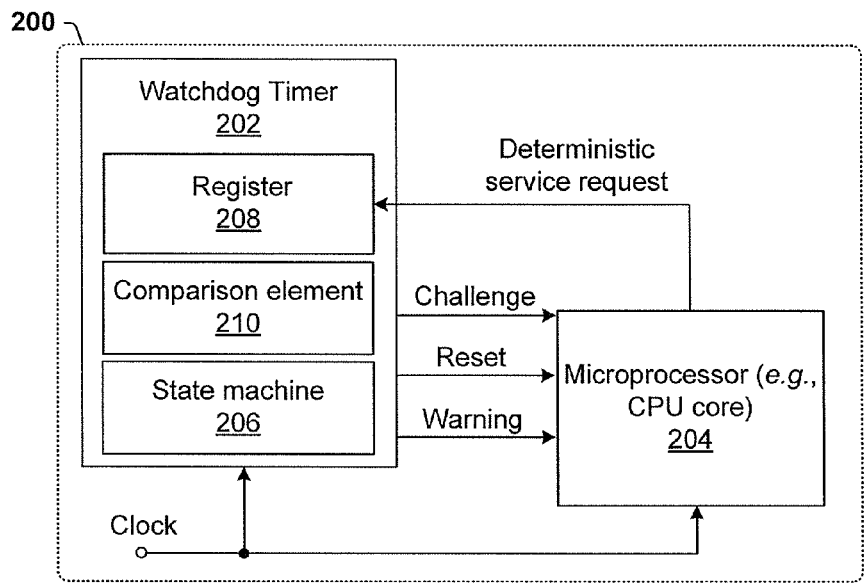
FIG. 2A is a block diagram of some embodiments of a disclosed watchdog timer configured to perform intermediary time checks between counter refreshes.

FIG. 2A illustrates some embodiments of a disclosed microcontroller 200 comprising a watchdog timer 202 configured to monitor operations of a microprocessor 204 by performing intermediary time checks between refreshing a state machine 206. Although described in relation to embedded microcontroller, the disclosed watchdog timer is not limited hereto. Rather, the disclosed watchdog timer may be applied to any high integrity system (e.g., banking, security, etc.)

The microcontroller 200 comprises a watchdog timer 202 in communication with a microprocessor 204. As provided herein, the microprocessor 204 may comprise a CPU core of a multi-core processor in some embodiments. The watchdog timer 202 is configured to monitor the operation of the microprocessor 204 using a challenge and response functionality.

The watchdog timer 202 comprises a state machine 206 configured to deterministically modify a state variable from an initial value over a watchdog period. For example, in some embodiments, the state machine 206 comprises a counter configured to periodically increment a value of the counter from an initial value $C_{init}$ over a watchdog period. In other embodiments, the state machine 206 comprises a counter is configured to periodically decrement a value of the counter from an initial value $C_{init}$ over a watchdog period.

The microprocessor 204 is configured to control operation of the watchdog timer 202 by way of deterministic service requests comprising an indicator of a monitoring operation to be performed, a password, and an estimated state variable. In some embodiments, the watchdog timer 202 may comprise a register 208 configured to control operation of the watchdog timer 202 based upon a deterministic service request comprising a register write having an indicator of a monitoring operation to be performed, a password, and an estimated counter value. In some embodiments, the register 208 may optionally comprise a password protected register configured to control operation of the watchdog timer 202. In other embodiments, the deterministic service request may comprise instructions and reserved operating modes.

The watchdog timer 202 is configured to monitor operation of the microprocessor 204 by way multiple service mechanisms including time checks and periodic refresh operations. The time checks are performed at any time that is within a watchdog period and determine if the microprocessor 204 is operating correctly without causing the state machine 206 to be modified or restarted. At the end of a watchdog period, the refresh operation restarts the state variable (e.g., counter value) at the initial value to prevent the microprocessor 204 from being reset.

In some embodiments, the watchdog timer 202 is configured to initiate a monitoring operation comprising an intermediate time check or a refresh operation by issuing a challenge to the microprocessor 204. In response to the challenge, the microprocessor 204 issues a response comprising the deterministic service request provided to watchdog timer 202. In some embodiments, the deterministic service request identifies the monitoring operation to be performed and provides a password and an estimated state variable to the watchdog timer 202 (e.g., an estimate of the current value of the counter). In some embodiments, an operating system within the microprocessor 204 uses a system clock common to the microcontroller 200 to determine the estimated counter value. A comparison element 210 is configured to compare the received password to an expected password and the received estimated state variable to an actual state variable and to determine if the microprocessor 204 is operating properly based upon the comparison.

For example, to perform a refresh operation the microprocessor 204 may send a deterministic service request to the register 208 comprising a register write having a password, an estimated counter value, and an indicator comprising a refresh command. If the comparison element 210 determines that the password and counter value are acceptable, no error is present in the microprocessor 204 and the state machine 206 is restarted (i.e., reset to the initial value $C_{init}$). If the comparison element 210 determines that the password or counter value are not acceptable, an error is present in the microprocessor 204 and the watchdog timer 202 operates to reset the microprocessor 204.

Alternatively, to perform a time check operation the deterministic service request may comprise a register write containing a password, a counter value, and an indicator comprising a time check command. If the comparison element 210 determines that the password and the counter value are acceptable, no error is present in the microprocessor 204 and the state machine 206 continues to operate without a change (i.e., the counter continues to modify its value in a deterministic way). However, if the comparison element 210 determines that the expected password or the estimated counter value are incorrect, an error is present in the system and an warning signal is generated to indicate that an error has occurred in the microprocessor (i.e., the tasks have not been performed as expected). In some embodiments, once a warning signal is generated, further deterministic service requests are prevented until the microprocessor 204 has been reset.

Figure 2B:
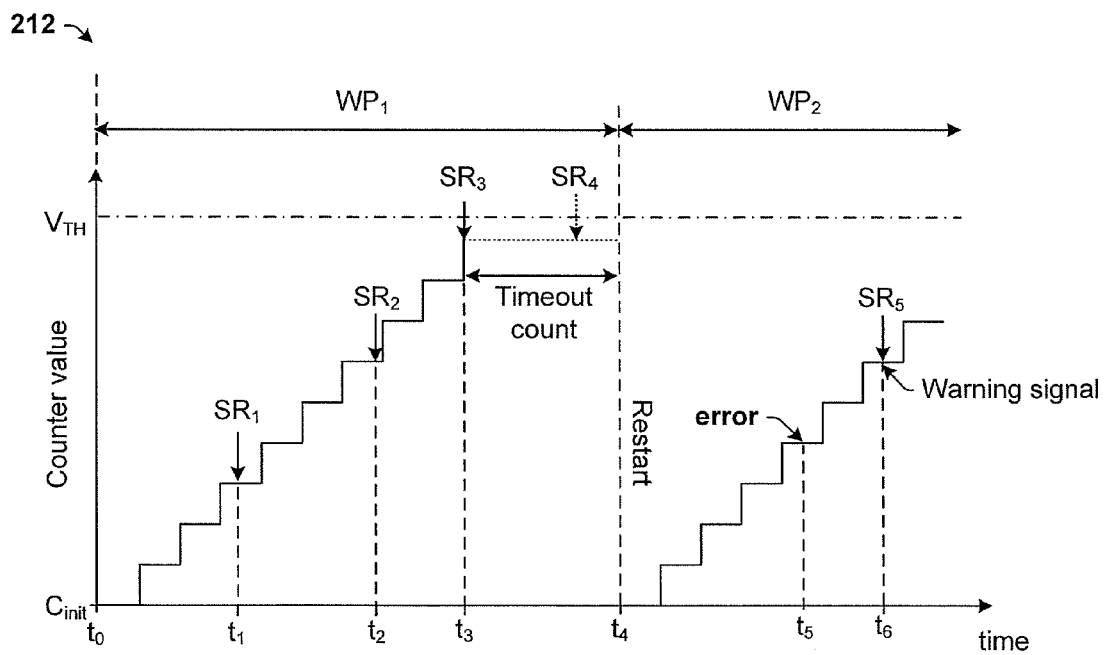
FIG. 2B is a timing diagram illustrating an exemplary operation of the disclosed watchdog timer of FIG. 2A FIGS. 3A-3B illustrate some embodiments of a disclosed watchdog timer configured to perform automatic password sequencing.

FIG. 2B is a timing diagram 212 illustrating an exemplary operation of the watchdog timer 202 having a state machine 206 comprising a counter configured to increment a state variable comprising a counter value.

During a first watchdog period $WP_1$, the counter begins to increment its value from an initial value $C_{init}$ at time $t_0$. At a first time $t_1$, a first deterministic service request $SR_1$ is carried out to perform a time check. During the first deterministic service request $SR_1$, the watchdog timer 202 receives an indicator comprising a time check command, a password, and an estimated counter value from the microprocessor. Since the password and estimated counter value are acceptable, the watchdog timer 202 takes no action and the counter continues to increment its value.

At a second time $t_2$, a second deterministic service request $SR_2$ is carried out to perform a time check. During the second deterministic service request $SR_2$, the watchdog timer 202 receives an indicator comprising a time check command, a password, and an estimated counter value from the microprocessor. Since the password and estimated counter value are acceptable, the watchdog timer 202 takes no action and the counter continues to increment its value.

At a third time $t_3$, a third deterministic service request $SR_3$ is carried out to perform a refresh operation. During the third deterministic service request $SR_3$, the watchdog timer 202 receives an indicator comprising a refresh command, a password, and an estimated counter value from the microprocessor 204. Since the password and estimated counter value are acceptable, the watchdog timer 202 starts a short timeout count, during which the watchdog timer 202 may receive a fourth deterministic service request $SR_4$ to adjust one or more parameters of the watchdog timer 202 (e.g., to update the password, change the refresh period, etc.). At the end of the timeout count, the watchdog timer 202 restarts the counter from the initial value $C_{init}$ at time $t_4$. By restarting the counter, the counter value does not reach the threshold value $V_{TH}$.

At a fifth time $t_5$, during a second watchdog period $WP_2$, an error occurs in the microprocessor 204 that causes the microprocessor 204 to malfunction. At a sixth time $t_6$ a fifth deterministic service request $SR_5$ is carried out to perform a time check. During the fifth deterministic service request $SR_5$, the watchdog timer 202 receives an indicator comprising a time check command, and an erroneous password or estimated counter value from the microprocessor 204. Since the password or estimated counter value are not acceptable, the watchdog timer 202 generates a warning signal that indicates the microprocessor 204 has malfunctioned.

Figure 3A:
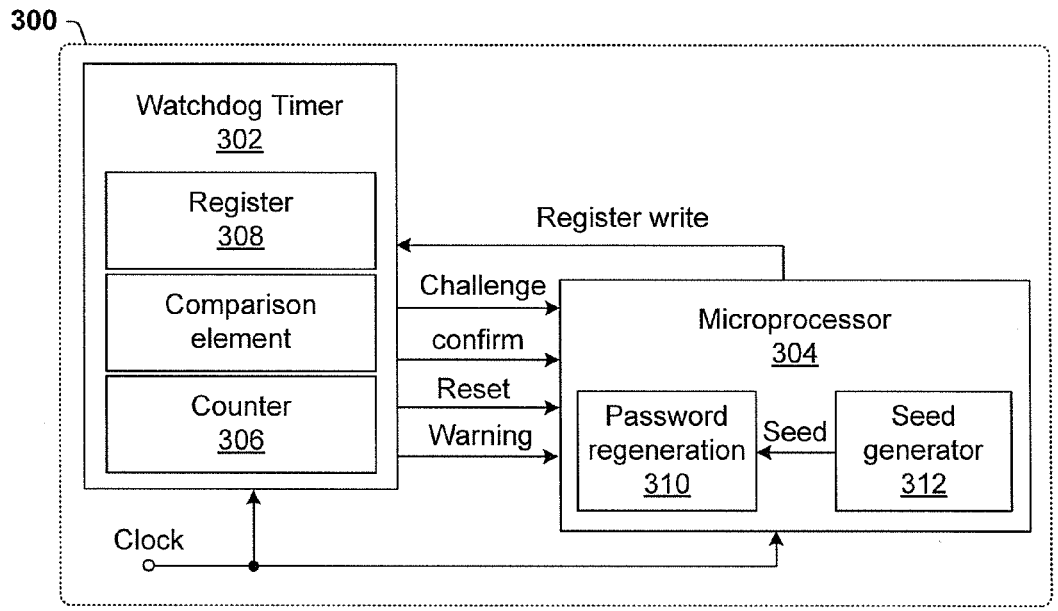

FIG. 3A illustrates some embodiments of a microcontroller 300 having a watchdog timer 302 configured to perform automatic password sequencing upon successful monitoring operations.

Although the following FIGS. 3A-6B are described in relation to a watchdog timer comprising a counter configured to increment its counter value and a microprocessor configured to provide a register write to a register that controls operation of the counter, it will be appreciated that the disclosed embodiments are not limited to such systems. For example, the disclosed embodiments may be applied to watchdog timers that count up, down, or that have state machines and to deterministic service requests comprising register writes, instructions, reserved modes, etc.

Referring to FIG. 3A, the microcontroller 300 comprises a watchdog timer 302 in communication with a microprocessor 304. The watchdog timer 302 is configured to monitor operation of the microprocessor 304 by way of monitoring operations comprising time checks and/or refreshes. Upon completing a successful time check or refresh operation, the watchdog timer 302 is configured to provide a confirmation signal to the microprocessor 304 that indicates that a successful monitoring operation has been completed.

The microprocessor 304 comprises a password regeneration element 310 configured to automatically re-generate the password provided to the watchdog timer 302 after each successful monitoring operation. Regenerating the password ensures that a password used for each monitoring operation is different, thereby ensuring that a complex calculation is performed by the microprocessor 304 to determine the next password and preventing accidental unlocks of the register 308.

In some embodiments, the password comprises a complex password generated from a variable seed value. For example, the password may be encoded such that it is based upon a seed value received from a seed generator 312 (e.g., a random number generator) at a successful time check or refresh operation. In such embodiments, the password regeneration element 310 is configured to manipulate the seed to turn it into a password that is used in a next monitoring operation (e.g., a time check or refresh operation). In some embodiments, the microprocessor 304 is configured to rewrite the seed after a refresh operation is performed to force the seed value back to an initial value. In such embodiments, the microprocessor 304 can repeat same sequence of patterns during each watchdog period.

Figure 3B:
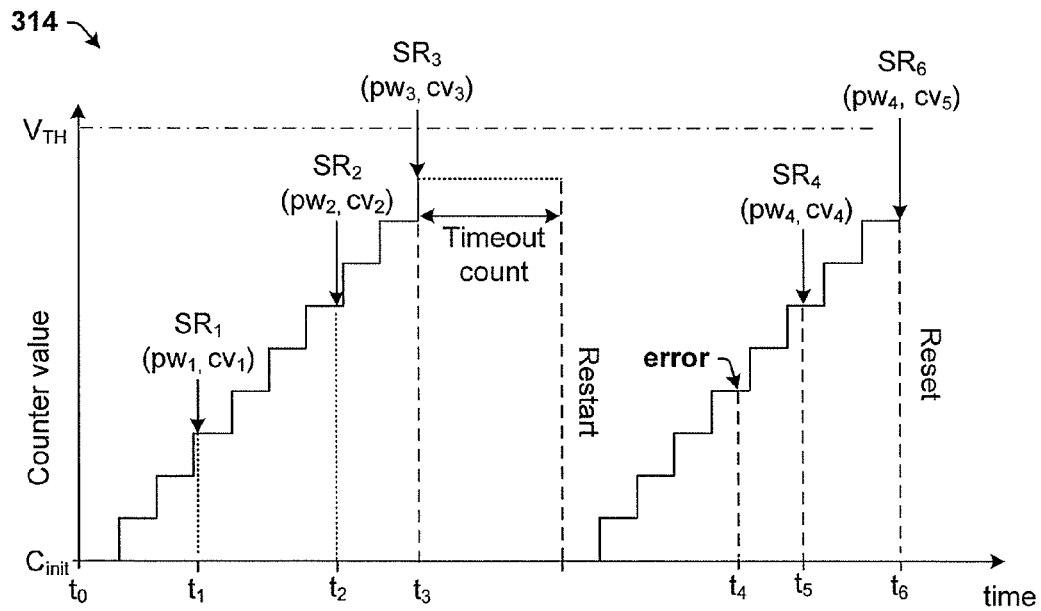

For example, FIG. 3B illustrates a timing diagram 314 of an exemplary operation of watchdog timer 302.

At time $t_0$, the counter 306 begins to count from an initial value $C_{init}$. At a first time $t_1$, a first deterministic service request $SR_1$ is carried out to perform a time check. During the first deterministic service request $SR_1$, the watchdog timer 302 receives a time check command, a first password $pw_1$, and an estimated first counter value $cv_1$ from the microprocessor 304. Since the first password $pw_1$ and the estimated first counter value $cv_1$ are acceptable, the watchdog timer 302 returns a confirmation signal to the microprocessor 304 indicating that a successful time check was performed. In response to the confirmation signal the password regeneration element 310 generates a second password $pw_2$.

At a second time $t_2$, a second deterministic service request $SR_2$ is carried out to perform a time check. During the time check, the watchdog timer 302 receives a time check command, the second password $pw_2$, and a second estimated counter value $cv_2$ from the microprocessor 304. Since the second password $pw_2$ and the second estimated counter value $cv_2$ are acceptable, the watchdog timer 302 returns a confirmation signal to the microprocessor 304 indicating that a successful time check was performed. In response to the confirmation signal the password regeneration element 310 generates a third password $pw_3$.

At a third time $t_3$, a third deterministic service request $SR_3$ is carried out to perform a refresh operation. During the third deterministic service request $SR_3$, the watchdog timer 202 receives a refresh command, the third password $pw_3$, and an estimated third counter value $cv_3$ from the microprocessor 304. Since the third password $pw_3$ and the third estimated counter value $cv_3$ are acceptable, the watchdog timer 302 starts a short timeout count, at the end of which the counter 306 returns to the initial value $C_{init}$.

At a fourth time $t_4$, an error in the operation of the microprocessor 304 occurs, which causes the microprocessor 304 to generate an erroneous password or counter value.

At a fifth time $t_5$, a fourth deterministic service request $SR_4$ is carried out to perform a time check. During the time check, the watchdog timer 302 receives a time check command, the fourth password $pw_4$, and a fourth estimated counter value $cv_4$ from the microprocessor 304. Due to the error, the fourth password $pw_4$ or estimated counter value $cv_4$ are erroneous, causing the watchdog timer 302 to issue a warning signal. Since the time check was not successful, the password is not regenerated.

At a sixth time $t_6$, a fifth deterministic service request $SR_5$ is carried out to perform a refresh operation. During the refresh operation, the watchdog timer 202 receives a refresh command, the fourth password $pw_4$, and a fifth estimated counter value $cv_4$ from the microprocessor. Since the password was not regenerated at time $t_5$, the fourth password $pw_4$ is not the expected password and the refresh is not successful. Therefore, a malfunction has occurred in the process flow of the microprocessor 304 and the microprocessor 304 is reset.

Figure 4A:
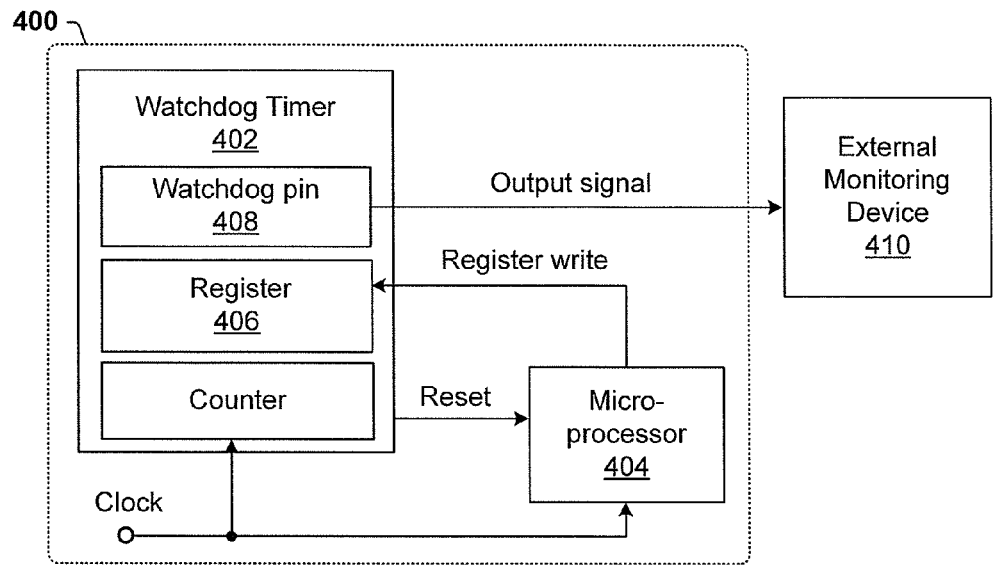
FIGS. 4A-4B illustrate some embodiments of a disclosed watchdog timer having a watchdog pin configured to provide a simple output signal to an external monitoring device to ensure proper operation of the watchdog timer.

FIG. 4A illustrates some embodiments of a microcontroller 400 having a watchdog timer 402 having a watchdog pin 408 configured to provide an output signal indicative of a common cause of failure in the microcontroller 400 to an external monitoring device 410.

The watchdog timer 402 is configured to monitor operation of the microprocessor 404 using a challenge and response functionality. Based upon a response of the microprocessor 404 to the watchdog timer 402, the watchdog timer 402 is configured to control a value of an output signal indicative of an error in the microcontroller. The output signal is provided at a watchdog pin 408, which is in communication with an external monitoring device 410 that is configured to monitor operation of the microcontroller 400.

In some embodiments, the watchdog timer 402 is configured to toggle a value of an output signal at the watchdog pin 408 (e.g., from a high value to a low value) depending whether a successful monitoring operation (e.g., time check)

has been performed. For example, in some embodiments, when a refresh operation is carried out, the output signal at the watchdog pin 408 is set to a high value. Upon a successful time check, the output signal at the watchdog pin 408 is toggled to a low value, indicating to the external monitoring device 410 that the microprocessor 404 is operating correctly. Upon an unsuccessful time check, the output signal at the watchdog pin 408 is not toggled to a low value, indicating to the external monitoring device 410 that the microprocessor 404 is not operating correctly.

In some embodiments, the external monitoring device 410 comprises a simple window watchdog timer configured to monitor transitions on the watchdog pin 408. For example, in some embodiments, the window watchdog is configured to look for a certain number of transitions on the watchdog pin 408 within a watchdog period. If the window watchdog does not see the certain number of transitions it determines that there is an error in the microprocessor (e.g., if the external device 410 sees no transitions or too many transitions it determines there is an error).

Figure 4B:
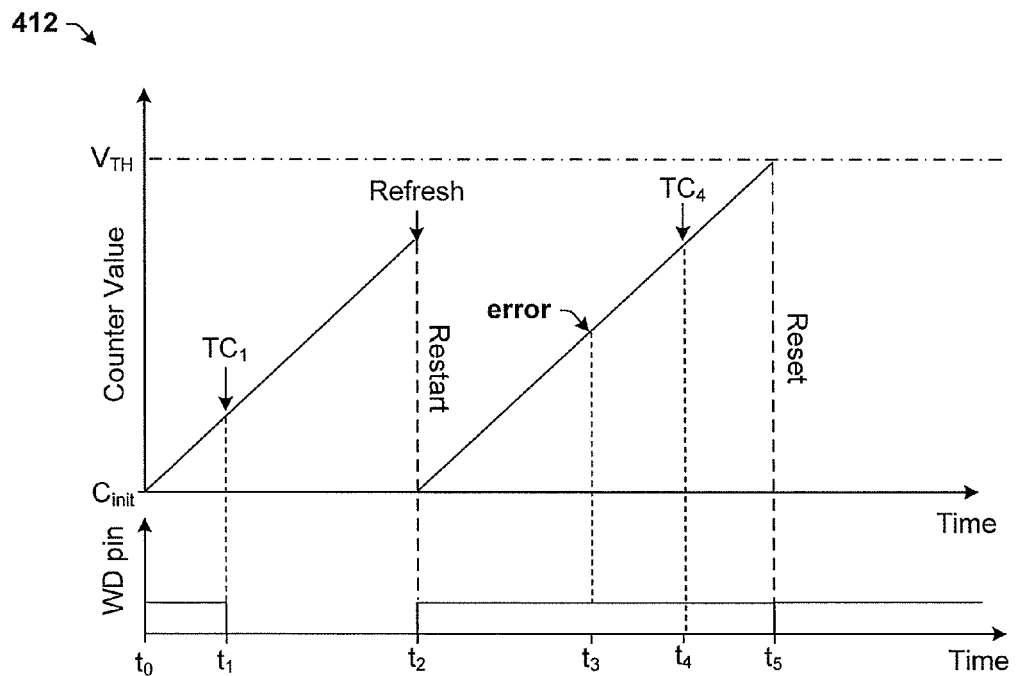

FIG. 4B illustrates a timing diagram 412 of an exemplary operation of the watchdog timer 402.

At an initial time $t_0$, a value at the watchdog pin 408 is set to a high value. Upon successfully performing a first time check $TC_1$ at time $t_1$, the value at the watchdog pin 408 is lowered from the high value to a low value. Toggling a value at the watchdog pin 408 indicates to the external monitoring device 410 that the microcontroller 400 is operating properly (i.e., there is no common cause of failure within microcontroller 400). A value at the watchdog pin 408 remains at the low value until a refresh operation is carried out at time $t_2$. The refresh operation restarts the value of the counter at the initial value $C_{init}$ and resets a value at the watchdog pin 408 to a high value.

At a time $t_3$, an error in the microprocessor 404 occurs. The error causes the microprocessor 404 to provide a deterministic service request to register 406 having an erroneous password or counter value estimate during a second time check $TC_2$ at time $t_4$. Since the second time check $TC_2$ is not successful, a value of the watchdog pin 408 remains high, indicating to the external monitoring device 410 that an error has occurred in operation of the microcontroller 400.

Therefore, in contrast to conventional watchdog timers which comprise an external watchdog that utilizes a challenge and response functionality to monitor operation of a microcontroller, the external monitoring device 410 determines if an internal watchdog is operating properly by monitoring a value at a watchdog pin. By monitoring a value at the watchdog pin an external monitoring device 410 having a simplified functionality can be used to ensure that microcontroller 400 is operating properly.

Figure 5A:
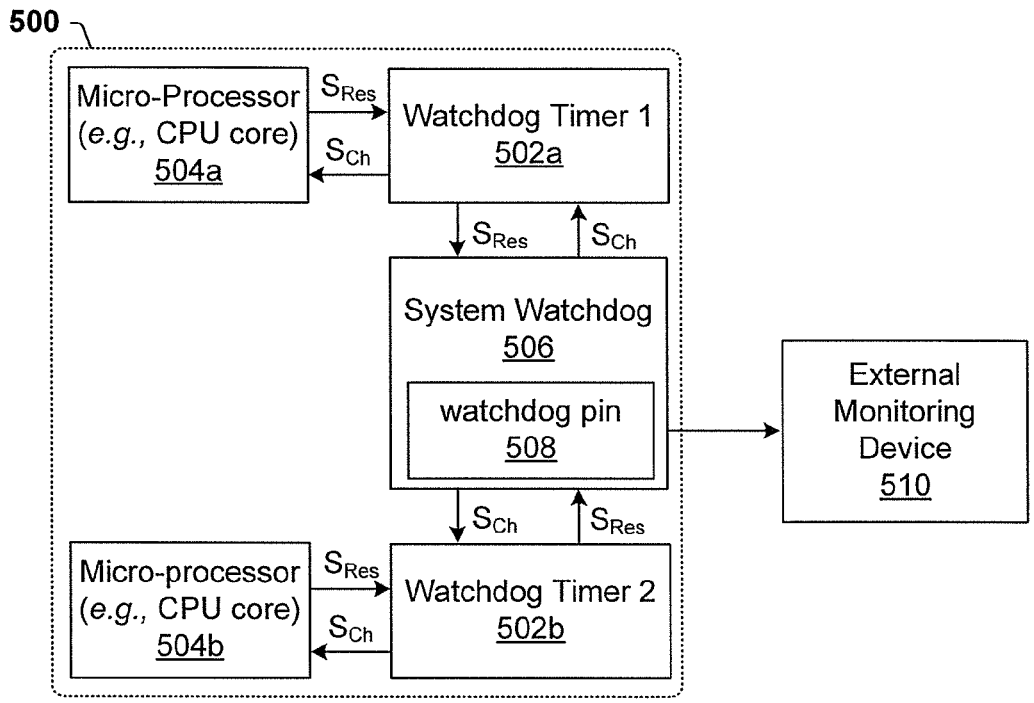
FIGS. 5A-5B illustrate some embodiments of a microprocessor comprising a plurality of watchdog timers monitored by an external monitoring device to ensure proper operation of the watchdog timers.

FIG. 5A illustrates some embodiments of a microcontroller 500 comprising a multi-core system having multiple microprocessors 504a and 504b (i.e, CPU cores). The microcontroller 500 comprises a system watchdog timer 506 having a watchdog pin 508 that provides for an output signal used to determine if any element within the microcontroller 500 is malfunctioning.

In particular, the microcontroller 500 comprises a plurality of microprocessors 504a and 504b (i.e., CPU cores) in communication with a plurality of internal watchdog timers 502a and 502b, respectively. A first watchdog timer 502a is configured to monitor operation of a first microprocessor 504a (core) and a second watchdog timer 502b is configured to monitor operation of a second microprocessor 504b (core) by executing a challenge and response functionality.

A system watchdog timer 506 is configured to monitor operation of each internal watchdog timer 502 by executing a challenge and response functionality. The system watchdog timer 506 comprises a watchdog pin 508 configured to provide a simple output signal that indicates a malfunction in any element within the microcontroller 500 (i.e., the system watchdog timer 502 combines the outputs of the internal watchdog timers 502 to generate a value at the watchdog pin 508 that will change if any of the internal watchdog timers 502 malfunction). An external monitoring device 510 (e.g., window watchdog) is configured to monitor the watchdog pin 508 and based upon the output signal to determine if the microcontroller 500 is operating properly.

Figure 5B:
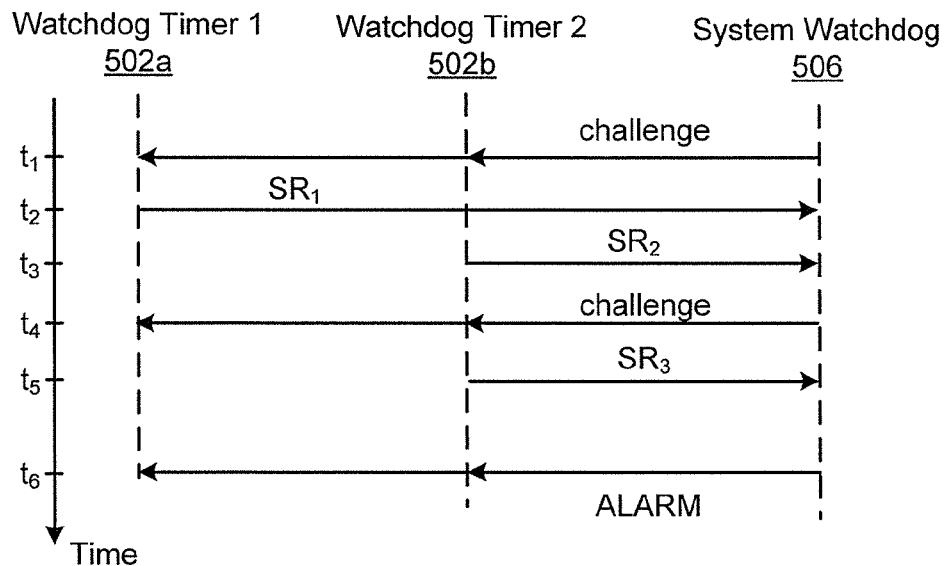

FIG. 5B illustrates a data flow diagram 512 showing operation the watchdog timers (502a, 502b, and 506) within microcontroller 500.

At a first time $t_1$, the system watchdog timer 506 issues a challenge to the first and second watchdog timers, 502a and 502b. At second and third times, $t_2$ and $t_3$, the first and second watchdog timers 502a and 502b respective provide responses comprising deterministic service requests, $SR_1$ and $SR_2$, to the system watchdog timer 506 to indicate that the first and second watchdog timers 502a and 502b are operating properly.

At a fourth time $t_4$, the system watchdog timer 506 issues a challenge to the first and second watchdog timers 502a and 502b. At a fifth time $t_5$ the first watchdog timer 502a issues a response comprising a deterministic service request $SR_3$ indicating that the first watchdog timer 502a is operating properly. However, the second watchdog timer 502b does not issue a response. Since the second watchdog timer 502b fails to issue a response, the system watchdog timer 506 generates a warning signal indicating that the microcontroller 500 is not operating properly. Once the warning signal is generated, further deterministic service requests are prevented until the microprocessor 504a and 504b have been reset.

Figure 6A:
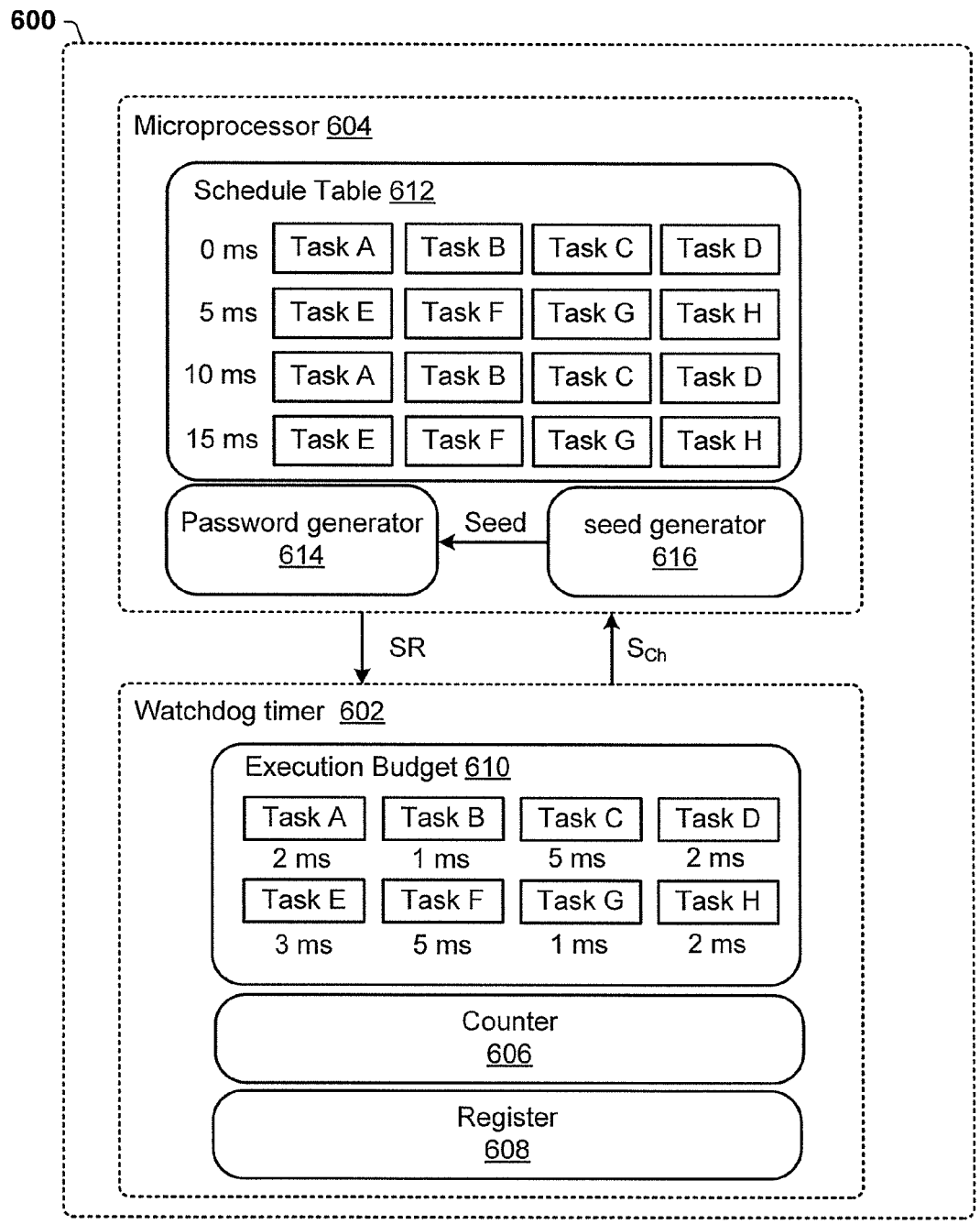
FIGS. 6A-6B illustrate some embodiments of a microcontroller comprising a watchdog timer configured to monitor the operation of a microprocessor on a task-by-task basis.
Figure 6B:
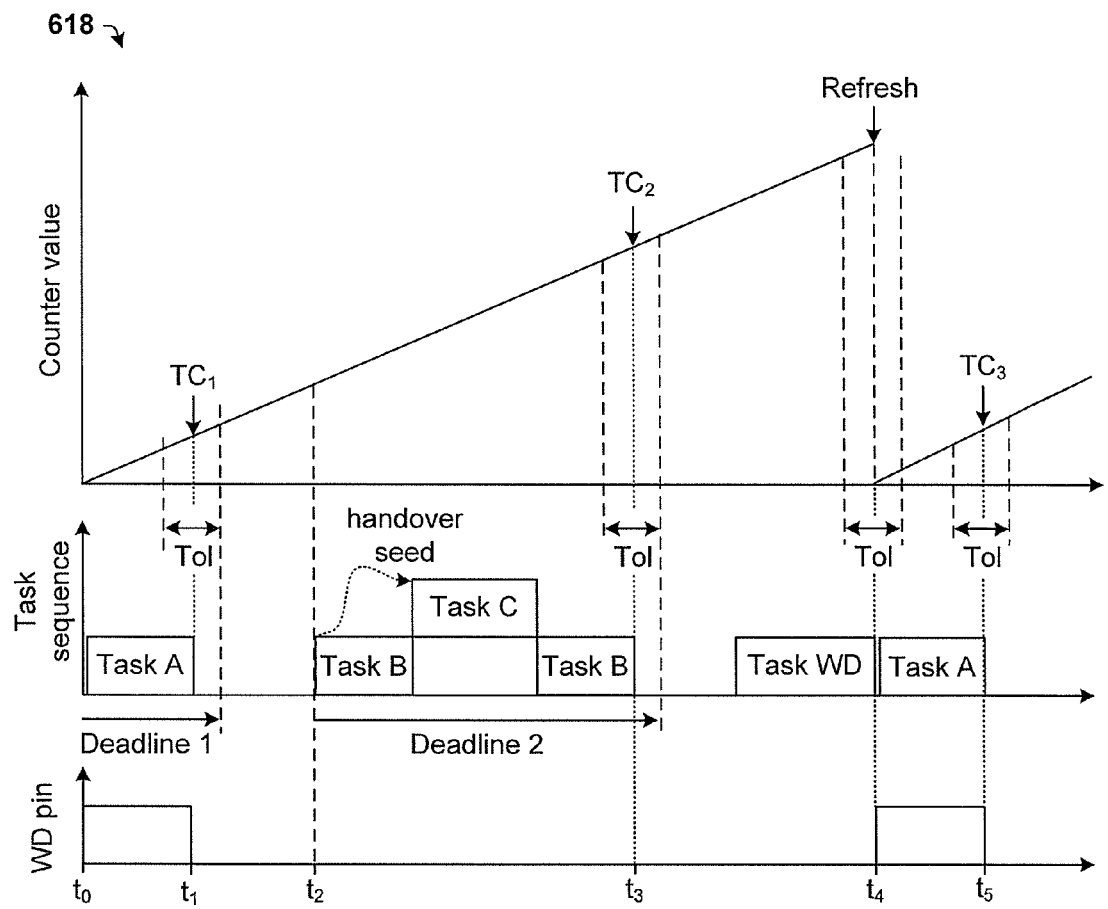

FIGS. 6A-6B illustrates some embodiments of a microcontroller comprising a watchdog timer configured to monitor the operation of a microprocessor on a task-by-task basis. The watchdog timer is configured to perform a challenge and response functionality on a task-by-task basis that ensures that scheduled tasks are performed in a correct sequence and within an allotted time period.

FIG. 6A illustrates a block diagram of a microcontroller 600 comprising a watchdog timer 602 configured to monitor the operation of a microprocessor 604 on a task-by-task basis.

Upon execution of a task, the watchdog timer 602 is configured to perform a monitoring operation (e.g., a time check or a refresh operation) of the microprocessor 604. The monitoring operation comprises a deterministic service request SR that identifies the monitoring operation to be performed and provides a password and an estimated counter value to the register 608. In some embodiments, the deterministic service request further indicates an associated task that has been or is to be performed. In some embodiments, the task may be encoded into the password. In other embodiments, the task may be provided as a separate component in a deterministic service request.

By monitoring operation of the microprocessor 604 based upon tasks, the watchdog timer 602 will perform monitoring operations at a higher frequency than the refresh operations of a conventional watchdog timer. For example, typically refresh operations of a watchdog timer occur in a watchdog period of 30-100 mS. However, in such a watchdog period the microprocessor 604 may run hundreds of tasks. By performing time checks between refresh operations, watchdog timer 602 ensures that the tasks are running properly (i.e., that monitors flow control of the microprocessor).

In some embodiments, the microprocessor 604 comprises a schedule table 612 comprising a schedule of tasks that are to be performed and an associated time at which the tasks are to be performed. For example, during a first time period (e.g., starting at 0 mS) Tasks A, B, C, and/or D are scheduled to be performed, while during a second time (e.g., starting at 5 mS) Tasks E, F, G, and/or H are scheduled to be performed. In some embodiments, the microprocessor 604 comprises a password regeneration element 614 in communication with the schedule table 612 and a seed generator 616. In such embodiments, the password regeneration element 614 is configured to generate a password from a seed and data stored in the schedule table 612. For very fast or dependent task sequences an initial seed can be manipulated at the start and end of each task then used as the time check. Seed manipulation is deterministic so can be computed for any given flow ahead of time. In some embodiments, the actual time a task is performed can be encoded into the password.

The watchdog timer 602 comprises a memory element configured to store an execution budget 610 comprising times allotted for a task to be performed. For example, in execution budget 610 the time allotted for Task A to be performed is 2 ms, for Task B to be performed is 1 ms, etc. In some embodiments, the execution budget 610 is used to determine a tolerance value that accounts for difference between an actual counter value and an estimated counter value due software execution time jitter. When added to an expected counter value, the tolerance value sets a deadline by which a task is to be performed. In some embodiments, the microprocessor 604 may reschedule tasks during processing, so that a plurality of tasks are performed during a task period. In such an embodiment, an operating system of the microprocessor 604 can adjust the deadline and/or tolerance based upon how tasks are rescheduled.

The microprocessor 604 comprises a password regeneration element 614 configured to automatically re-generate the password provided to the watchdog timer 602 after each successful password check. Since time checks are performed in relation to the tasks, watchdog timer 602 is able to service a plurality of tasks occurring within a watchdog period. For example, by performing time checks at the start or finish of a task, the watchdog timer 602 is able to accurately monitor the tasks that are being performed by the microprocessor 604 and to determine if an error has occurred and/or during which task the error occurred. For example, if any time check is skipped, then the password is incorrect for final reset password and microcontroller will reset.

Furthermore, automatically regenerating a password after a successful monitoring operation allows the watchdog timer 602 to monitor program flow. This is because each pattern of tasks is different within a given watchdog period. Therefore, by checking if the sequence of responses is correct a software task sequence plausibility can be checked (e.g., if incorrect password is received the watchdog timer 602 is able to detect a wrong sequence) or the software task runtime plausibility (e.g., if incorrect estimated counter values are received the watchdog timer 602 is able to detect a runtime error). For example, in some embodiments, the watchdog timer 602 is able to accurately monitor that password checks are performed in a correct sequence to ensure that scheduled tasks are actually started in the right sequence/right time and/or to ensure that scheduled tasks complete within expected execution budget.

FIG. 6B illustrates a timing diagram 618 showing operation of watchdog timer 602 to monitor the operation of microprocessor 604 on a task-by-task basis.

At time $t_0$, the watchdog timer 602 issues a challenge to the microprocessor 604. At the end of task A, the microprocessor 604 is configured to perform a first time check $TC_1$ by returning a first deterministic service request to the watchdog timer 602. The first deterministic service request provides a password and an estimated counter value to the watchdog timer 602. If the estimated counter value is within a predetermined tolerance range, the watchdog timer 602 accepts the estimated counter value. In some embodiments, the estimated counter value is inverted to provide additional complexity.

At time $t_2$ task B is started. During execution of task B, the microprocessor reschedules Task C to be operated (e.g., when running task B subtask C runs to compute values used in task B). To account for the rescheduling of task C, the watchdog timer 602 can adjust the deadline based upon a sum of the different tasks. For example, in some embodiments the execution budge of the tasks are summed by handing seed and password though the tasks (e.g., a first seed is handed to from task B to task C, which adds to the execution budget before handing the seed back to task B, which adds to the execution budget to generate a modified seed that becomes a next password).

Figure 7:
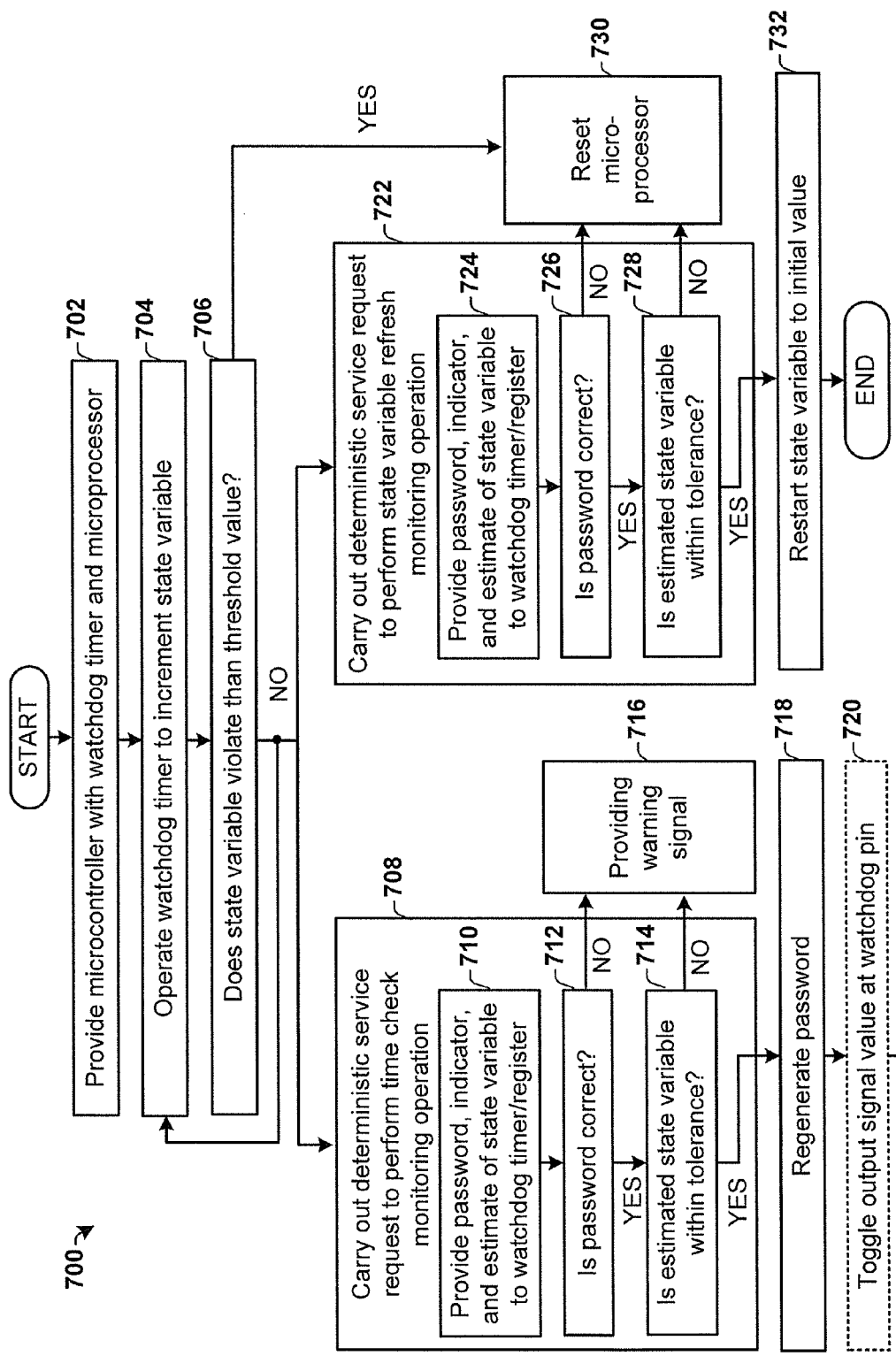
FIG. 7 is a flow diagram of an exemplary method of operating a watchdog timer.

FIG. 7 is a flow diagram of an exemplary method 700 for operating a watchdog timer.

It will be appreciated that while method 700 is illustrated and described below as a series of acts or events, the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

At 702 a microcontroller comprising a watchdog timer and a microprocessor is provided. The watchdog timer is configured to monitor the operation of a microprocessor.

At 704, the watchdog timer is operated to increment a value of a state variable within the watchdog timer. In some embodiments, the state variable may comprise a counter value.

At 706, the state variable is compared to a threshold value to determine if the state variable violates the threshold value. If the state variable violates the threshold value, then the microprocessor has malfunctioned and the microprocessor is reset at 730. If the state variable does not violate the threshold value, then the microprocessor is functioning. Acts 704 and 706 are continually performed so as to continually deterministically modify the state variable from an initial value over a watchdog period.

At 708, a deterministic service request is carried out to perform a monitoring operation comprising a time check. The deterministic service request provides a password, an indicator, and an estimate of a current state variable to the watchdog timer and/or a register within the watchdog timer (710). The indicator indicates that a time check is to be carried out. If the password is incorrect (712) (i.e., the password does is not the same as an expected password) or the state variable is not within a tolerance value (714) a warning signal is output from the watchdog time (716). If the password is correct (712) and the state variable is within the tolerance value (714), the time check is successful.

If the time check is successful, a password may be regenerated at 718. Regenerating the password causes a new password to be used for subsequent monitoring operations (e.g., 708 or 722). If the time check is successful, a value of an output signal at a watchdog pin may also be toggled at 720. The value of the watchdog pin is indicative of whether or not the microcontroller is operating correctly.

At 722, a deterministic service request is carried out to perform a monitoring operation comprising a state variable refresh. The deterministic service request provides a password, an indicator, and an estimate of a current state variable to a watchdog timer and/or a register within the watchdog timer (724). The indicator indicates that a time check is to be carried out. If the password is incorrect (726) or the state variable is not within a tolerance value (728) the microprocessor is reset at 730. If the password is correct (726) and the state variable is within a tolerance value (728), the time check is successful and the state variable is restarted at the initial value at 732.

It will be appreciated that equivalent alterations and/or modifications may occur to those skilled in the art based upon a reading and/or understanding of the specification and annexed drawings. The disclosure herein includes all such modifications and alterations and is generally not intended to be limited thereby. For example, although the figures provided herein, are illustrated and described to have a particular doping type, it will be appreciated that alternative doping types may be utilized as will be appreciated by one of ordinary skill in the art.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

What is claimed is:

1. A watchdog timer, comprising:
    a state machine configured to deterministically modify a state variable-over a watchdog period;
    a microprocessor configured to provide a deterministic service request to the watchdog timer to control operation of the watchdog timer, wherein the deterministic service request comprises an indicator of a monitoring operation to be performed, a password, and an estimate of a current value of the state variable; and
    a comparison element configured to determine if the microprocessor is operating properly based upon a comparison of the password to an expected password and the estimate of the current value of the state variable to the state variable.

2. The watchdog timer of claim 1, wherein the comparison element is configured to determine that the microprocessor is operating properly if the password is equal to the expected password and if the estimate of the current value of the state variable is within a tolerance value of the state variable.

3. The watchdog timer of claim 2,
    wherein the indicator comprises a time check command;
    wherein the watchdog timer is configured to take no action if an initial value of the password is equal to the expected password and if the estimate of the current value of the state variable is within the tolerance value of the state variable; and
    wherein the watchdog timer is configured to generate a warning signal if the password is not equal to the expected password or if the estimate of the current value of the state variable is not within a tolerance value of the state variable.

4. The watchdog timer of claim 3,
    wherein the indicator comprises a refresh command;
    wherein the watchdog timer is configured to restart the state variable to the initial value if the initial value if the password is equal to the expected password and if the estimate of the current value of the state variable is within the tolerance value of the state variable; and
    wherein the watchdog timer is configured to generate a reset signal that resets the microprocessor if the password is not equal to the expected password or if the estimate of the current value of the state variable is not within a tolerance value of the state variable.

5. The watchdog timer of claim 4, wherein the warning signal prevents further deterministic service requests from occurring until the microprocessor is reset.

6. The watchdog timer of claim 1, further comprising:
    a password regeneration element configured to receive a confirmation signal from the watchdog timer if the password is equal to the expected password and if the estimate of the current value of the state variable is within a tolerance value of the state variable,
    wherein upon receiving a confirmation signal the password regeneration element is configured to generate a new password having a different value than the password.

7. The watchdog timer of claim 1, further comprising:
    a watchdog output pin configured to provide an output signal having a value indicative of whether the watchdog timer is operating properly.

8. An embedded system, comprising:
    a microcontroller, comprising:
        a watchdog timer having a state machine configured to deterministically modify a state variable over a watchdog period;
        a microprocessor configured to provide a deterministic service request to the watchdog timer, wherein the deterministic service request comprises an indicator of a monitoring operation to be performed, a password, and an estimated state variable; and
    a password regeneration element configured to receive a confirmation signal from the watchdog timer if the password is equal to the expected password and if the estimated state variable is within a tolerance value of the actual state variable,
    wherein upon receiving a confirmation signal the password regeneration element is configured to generate a new password having a different value than the password,
    wherein the watchdog timer is configured to determine if the microprocessor is operating properly based upon a comparison of the password to an expected password and the estimated state variable to an actual state variable.

9. The embedded system of claim 8, further comprising:
    a system watchdog timer comprised within the microcontroller;
    wherein the system watchdog timer is configured to provide a challenge to the watchdog timer, to receive a response from the watchdog timer, and generate an output value indicative of whether the microcontroller is operating properly at a watchdog pin.

10. The embedded system of claim 9, wherein the microcontroller comprises a multi-core system, comprising:
   a plurality of microprocessors; and
   a plurality of watchdog timers, wherein respective watchdog timers are configured to monitor the operation of one of the plurality of microprocessors.

11. The embedded system of claim 10,
   wherein the system watchdog timer is configured to provide a challenge to the plurality of watchdog timers, to receive a plurality of responses from the plurality of watchdog timers, and generate the output value based upon the plurality of responses,
   wherein the output value indicates a failure of any one of the plurality of watchdog timers.

12. The embedded system of claim 9, further comprising:
   an external monitoring device configured to monitor the watchdog pin and to determine if the microcontroller is operating properly.

13. The embedded system of claim 9, wherein the output value is configured to toggle between a first value or a second value.

14. The embedded system of claim 8,
   wherein the indicator comprises a time check command;
   wherein the watchdog timer is configured to take no action if the initial value if the password is equal to the expected password and if the estimated state variable is within a tolerance value of the actual state variable; and
   wherein the watchdog timer is configured to generate a warning signal if the password is not equal to the expected password or if the estimated state variable is not within a tolerance value of the actual state variable.

15. The embedded system of claim 14, wherein microprocessor is configured to provide a deterministic service request comprising a register write comprising the time check command at a beginning or end of a task run by the microprocessor.

16. The embedded system of claim 14,
   wherein the indicator comprises a refresh command;
   wherein the watchdog timer is configured to restart the state variable to the initial value if the initial value if the password is equal to the expected password and if the estimated state variable is within the tolerance value of the actual state variable; and
   wherein the watchdog timer is configured to generate a reset signal that resets the microprocessor if the password is not equal to the expected password or if the estimated state variable is not within a tolerance value of the actual state variable.

17. A method, comprising:
   providing a microcontroller with a watchdog timer and a microprocessor;
   periodically incrementing a state variable of the watchdog timer from an initial value during a watchdog period extending from a time the state variable has the initial value until the state variable is restarted to the initial value; and
   providing a deterministic service request from the microprocessor to the watchdog timer at a time within the watchdog period, wherein the deterministic service request comprises an indicator of a monitoring operation, a password, and an estimate of a current value of the state variable.

18. The method of claim 17,
   receiving an indicator value comprising a time check command;
   taking no action if the initial value if the password is equal to an expected password and if the estimate of the current value of the state variable is within a tolerance value of the state variable; and
   generating a warning signal if the password is not equal to the expected password or if the estimate of the current value of the state variable is not within the tolerance value of the state variable.

19. The method of claim 18,
   receiving an indicator value comprising a refresh command;
   restarting the state variable to the initial value if the password is equal to the expected password and if the estimate of the current value of the state variable is within a tolerance value of the actual state variable; and
   generating a reset signal that resets the microprocessor if the password is not equal to the expected password or if the estimate of the current value of the state variable is not within the tolerance value of the state variable.

20. The method of claim 17, further comprising:
   generating a new password to have a different value than the password if the password is equal to an expected password and if the estimate of the current value of the state variable is within a tolerance value of the state variable.

21. The method of claim 17, further comprising:
   toggling a value of an output signal having an output value indicative of whether the microcontroller is operating properly if the password is equal to an expected password and if the estimate of the current value of the state variable is within a tolerance value of the state variable.

22. The method of claim 17, further comprising:
   beginning a timeout period upon comparison of the password to a stored password stored within the watchdog timer; and
   resetting the state variable to the initial value if the password is not provided to the watchdog timer before the timeout period expires.

* * * * *